United States Patent
Littlejohn et al.

(10) Patent No.: US 9,549,293 B2
(45) Date of Patent: *Jan. 17, 2017

(54) PREEMPTIVE TUNING

(71) Applicant: iHeartMedia Management Services, Inc., San Antonio, TX (US)

(72) Inventors: Jeffrey Lee Littlejohn, Cincinnati, OH (US); Michael Lincoln Albl, Cincinnati, OH (US); Jeffrey D. Zigler, Omaha, NE (US); Kevin R. Lockhart, Ogallala, NE (US); Richard D. Wooden, Ogallala, NE (US); Jacqueline J. Lockhart, Poway, CA (US); Theodore N. Myers, Fort Collins, CO (US); Evan A. Hill, Bend, OR (US); Tanya R. Jellison, Ogallala, NE (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,627

(22) Filed: Oct. 20, 2015

(65) Prior Publication Data

US 2016/0043747 A1 Feb. 11, 2016

Related U.S. Application Data

(63) Continuation of application No. 14/504,557, filed on Oct. 2, 2014, now Pat. No. 9,203,445, which is a (Continued)

(51) Int. Cl.
*H04B 1/18* (2006.01)
*H04W 4/02* (2009.01)
(Continued)

(52) U.S. Cl.
CPC ............ *H04W 4/028* (2013.01); *G06N 99/005* (2013.01); *H04B 1/006* (2013.01); *H04B 1/1027* (2013.01);
(Continued)

(58) Field of Classification Search
CPC ......... H04B 1/006; H04B 1/1027; H04B 1/14; H03J 7/183; H04H 20/22
(Continued)

(56) References Cited

U.S. PATENT DOCUMENTS

| 4,521,915 A | 6/1985 | Baker et al. |
| 5,432,542 A | 7/1995 | Thibadeau et al. |

(Continued)

FOREIGN PATENT DOCUMENTS

WO 0116781 3/2001

OTHER PUBLICATIONS

International Search Report: Application No. PCT/US08/074915 dated Jan. 9, 2009, 4 pages.

*Primary Examiner* — Simon Nguyen
(74) *Attorney, Agent, or Firm* — Garlick & Markison; Edward J. Marshall

(57) ABSTRACT

A media receiver identifies attributes of a media station to which the media receiver is currently tuned. The media receiver monitors the signal quality of the media station. If the signal quality of the media station drops below a quality threshold, the receiver chooses an alternate station having similar content, and then tunes to the alternate station until the signal quality of the original station improves. When the signal quality of the original station rises above a re-tune threshold, the receiver can switch back to the original station. The receiver can monitor and record user listening patterns, station-switching patterns, and situational parameters, to identify times or locations at which station switches (Continued)

occur. This information can be used to select appropriate alternative stations, to perform pre-emptive station switches, and to determine when a station's content will be buffered with the expectation that a station's signal will drop below the quality threshold.

20 Claims, 9 Drawing Sheets

Related U.S. Application Data continuation-in-part of application No. 13/557,859, filed on Jul. 25, 2012, now Pat. No. 8,892,025, which is a continuation of application No. 12/201,984, filed on Aug. 29, 2008, now Pat. No. 8,260,230.

(60) Provisional application No. 60/969,499, filed on Aug. 31, 2007.

(51) Int. Cl.

| | |
|---|---|
| *H04B 1/00* | (2006.01) |
| *H04B 1/10* | (2006.01) |
| *G06N 99/00* | (2010.01) |
| *H04H 20/22* | (2008.01) |
| *H04N 21/438* | (2011.01) |
| *H04N 21/442* | (2011.01) |
| *H04N 21/45* | (2011.01) |
| *H04N 21/25* | (2011.01) |
| *H04N 21/466* | (2011.01) |
| *H04L 12/26* | (2006.01) |
| *H04W 72/02* | (2009.01) |
| *H04H 60/46* | (2008.01) |
| *H04H 60/72* | (2008.01) |

(52) U.S. Cl.
CPC .............. *H04H 20/22* (2013.01); *H04L 43/16* (2013.01); *H04N 21/251* (2013.01); *H04N 21/4383* (2013.01); *H04N 21/44209* (2013.01); *H04N 21/4532* (2013.01); *H04N 21/466* (2013.01); *H04N 21/4667* (2013.01); *H04W 4/02* (2013.01); *H04W 72/02* (2013.01); *H04H 60/46* (2013.01); *H04H 60/72* (2013.01)

(58) Field of Classification Search
USPC .... 455/135–136, 150.1, 151.1, 152.1, 161.3, 455/164.1, 179.1, 184.1, 185.1, 186.1
See application file for complete search history.

(56) References Cited

U.S. PATENT DOCUMENTS

| | | | |
|---|---|---|---|
| 5,701,599 A | 12/1997 | Aihara | |
| 6,094,568 A * | 7/2000 | Kianush | H03J 1/0066 455/161.1 |
| 6,389,463 B2 | 5/2002 | Bolas et al. | |
| 6,546,427 B1 | 4/2003 | Ehrlich et al. | |
| 6,564,003 B2 | 5/2003 | Marko et al. | |
| 6,570,891 B1 | 5/2003 | Arimilli | |
| 6,725,022 B1 | 4/2004 | Clayton et al. | |
| 6,728,531 B1 | 4/2004 | Lee et al. | |
| 6,741,869 B1 | 5/2004 | Lehr | |
| 6,822,953 B1 | 11/2004 | Schaefer et al. | |
| 6,920,479 B2 | 7/2005 | McDowall et al. | |
| 6,934,697 B1 | 8/2005 | Warren | |
| 6,957,053 B1 * | 10/2005 | Moers | H03J 1/0083 455/161.2 |
| 6,957,264 B1 | 10/2005 | Jacobs | |
| 7,003,530 B2 | 2/2006 | Johnson | |
| 7,316,026 B2 | 1/2008 | Ohno et al. | |
| 7,757,255 B2 | 7/2010 | Takagi et al. | |
| 7,865,923 B2 | 1/2011 | Yoshigahara | |
| 7,865,930 B2 | 1/2011 | Kim | |
| 7,917,925 B2 | 3/2011 | Eigeldinger | |
| 7,984,467 B2 | 7/2011 | Hansen-Turton | |
| 8,037,497 B2 | 10/2011 | Seo et al. | |
| 8,116,216 B2 | 2/2012 | Nogami et al. | |
| 8,238,810 B2 | 8/2012 | Uppala | |
| 8,260,230 B2 | 9/2012 | Zigler et al. | |
| 2001/0042109 A1 | 11/2001 | Bolas et al. | |
| 2002/0073171 A1 | 6/2002 | McDowall et al. | |
| 2002/0132617 A1 | 9/2002 | Nuss et al. | |
| 2003/0026597 A1 | 2/2003 | Cho et al. | |
| 2003/0139181 A1 * | 7/2003 | Roy | H04W 36/0083 455/427 |
| 2003/0159143 A1 | 8/2003 | Chan | |
| 2004/0110522 A1 | 6/2004 | Howard et al. | |
| 2004/0237122 A1 | 11/2004 | Yamaguchi et al. | |
| 2004/0244050 A1 | 12/2004 | Kim | |
| 2004/0266430 A1 * | 12/2004 | Fudim | H04W 48/16 455/434 |
| 2005/0191958 A1 | 9/2005 | Hoskins | |
| 2005/0191979 A1 * | 9/2005 | Spellman | H04B 1/005 455/178.1 |
| 2005/0208913 A1 | 9/2005 | Raisinghani et al. | |
| 2005/0227624 A1 | 10/2005 | Hiddink et al. | |
| 2005/0257237 A1 | 11/2005 | Yamamoto | |
| 2005/0266813 A1 | 12/2005 | Ricard et al. | |
| 2006/0028995 A1 | 2/2006 | Canoy et al. | |
| 2006/0067304 A1 | 3/2006 | McDowall et al. | |
| 2006/0111038 A1 | 5/2006 | Tatsumi et al. | |
| 2006/0126488 A1 | 6/2006 | Kang | |
| 2006/0168097 A1 | 7/2006 | Pittelli | |
| 2006/0184992 A1 | 8/2006 | Kortum et al. | |
| 2006/0245605 A1 | 11/2006 | Matsunaga | |
| 2006/0285489 A1 * | 12/2006 | Francisco | H04L 12/2602 370/229 |
| 2007/0005795 A1 | 1/2007 | Gonzalez | |
| 2007/0014536 A1 | 1/2007 | Hellman | |
| 2007/0061862 A1 | 3/2007 | Berger et al. | |
| 2007/0067796 A1 | 3/2007 | Seo | |
| 2007/0129003 A1 | 6/2007 | Dunko | |
| 2007/0164903 A1 * | 7/2007 | Takada | G04R 20/10 342/389 |
| 2007/0229350 A1 * | 10/2007 | Scalisi | G06F 21/35 342/350 |
| 2007/0263124 A1 | 11/2007 | Nishi | |
| 2007/0287451 A1 | 12/2007 | Seo et al. | |
| 2008/0074915 A1 | 3/2008 | Terzioglu et al. | |
| 2008/0139109 A1 * | 6/2008 | Ewertz | H04H 20/12 455/3.01 |
| 2008/0242280 A1 | 10/2008 | Shapiro et al. | |
| 2008/0248743 A1 * | 10/2008 | Krinsky | H04H 20/26 455/3.06 |
| 2009/0023406 A1 * | 1/2009 | Ellis | H04B 1/20 455/140 |
| 2009/0270047 A1 | 10/2009 | Heijnen | |
| 2009/0300683 A1 | 12/2009 | Rynkowski | |
| 2010/0027452 A1 | 2/2010 | Skinner et al. | |
| 2010/0159836 A1 * | 6/2010 | Lau | H04H 20/22 455/42 |

\* cited by examiner

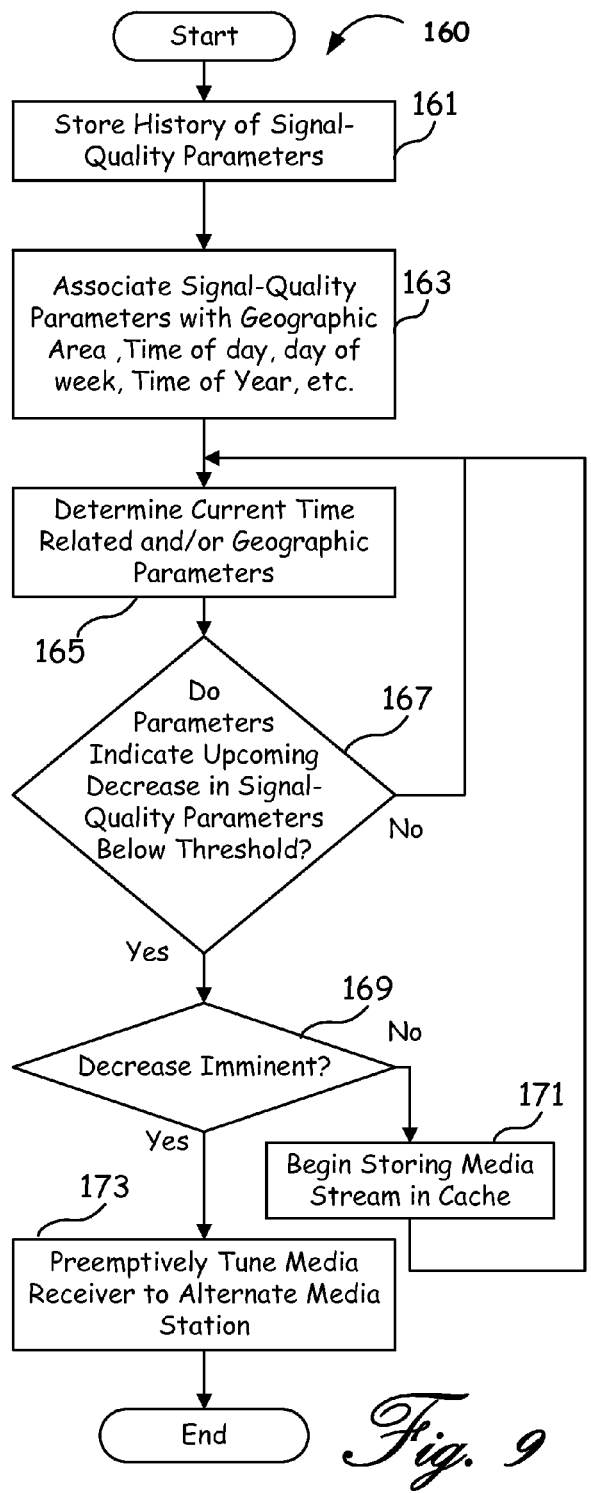
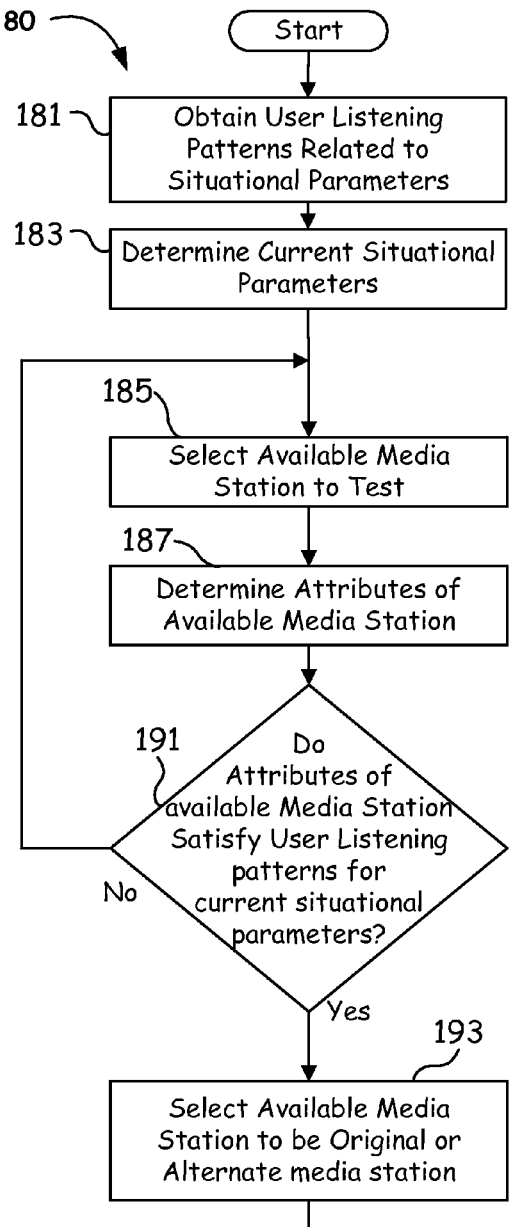
Fig. 9
Fig. 10

PREEMPTIVE TUNING

CROSS-REFERENCE TO RELATED APPLICATIONS

The present U.S. Utility Patent Application claims priority pursuant to 35 U.S.C. §120 as a continuation of U.S. Utility application Ser. No. 14/504,557, entitled "MITIGATING MEDIA STATION INTERRUPTIONS," filed Oct. 2, 2014, which is a continuation-in-part of U.S. Utility application Ser. No. 13/557,859, entitled, "RADIO RECEIVER AND METHOD FOR RECEIVING AND PLAYING SIGNALS FROM MULTIPLE BROADCAST CHANNELS," filed Jul. 25, 2012, now U.S. Pat. No. 8,892,025, which is a continuation of U.S. Utility application Ser. No. 12/201,984, entitled "RADIO RECEIVER AND METHOD FOR RECEIVING AND PLAYING SIGNALS FROM MULTIPLE BROADCAST CHANNELS," filed Aug. 29, 2008, now U.S. Pat. No. 8,260,230, which claims priority to U.S. Provisional Application No. 60/969,499, entitled "RADIO RECEIVER AND METHOD FOR RECEIVING AND PLAYING SIGNALS FROM MULTIPLE BROADCAST CHANNEL," filed Aug. 31, 2007, all of which are hereby incorporated herein by reference in their entirety and made part of the present U.S. Utility Patent Application for all purposes.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

BACKGROUND

This application relates generally to radio systems. More specifically, this application relates to a new type of radio receiver as well as associated systems and methods that support advanced functionality of such receiver and that more broadly apply to other systems.

SUMMARY

A media receiver, for example a radio, can include a receiver adaptable for receiving a plurality of broadcast stations over a plurality of broadcast channels. If the signal quality of a station to which the media receiver is tuned degrades too much, the media receiver can attempt to identify an alternate media station, and automatically tune to the alternate station until the signal quality of the originally tuned media station improves, at which point the media receiver can re-tune to the originally tuned station. A history of signal quality parameters and user listening patterns can be maintained and used to help the media receiver select an appropriate alternate media station, and to preemptively tune to that media station or start caching content from that media station.

BRIEF DESCRIPTION OF THE APPENDIX

Appendix A, which is attached hereto and incorporated herein by reference, lists certain EPG and database identifiers as may be used in some embodiments.

BRIEF DESCRIPTION OF THE DRAWINGS

FIG. 9 is a flowchart illustrating using a history of signal-quality parameters associated with particular geographic locations or times to mitigate media station interruptions according to various embodiments of the present disclosure.

FIG. 10 is a flowchart illustrating the selection of alternate media stations according to various embodiments of the present disclosure.

DETAILED DESCRIPTION

Figure 1:
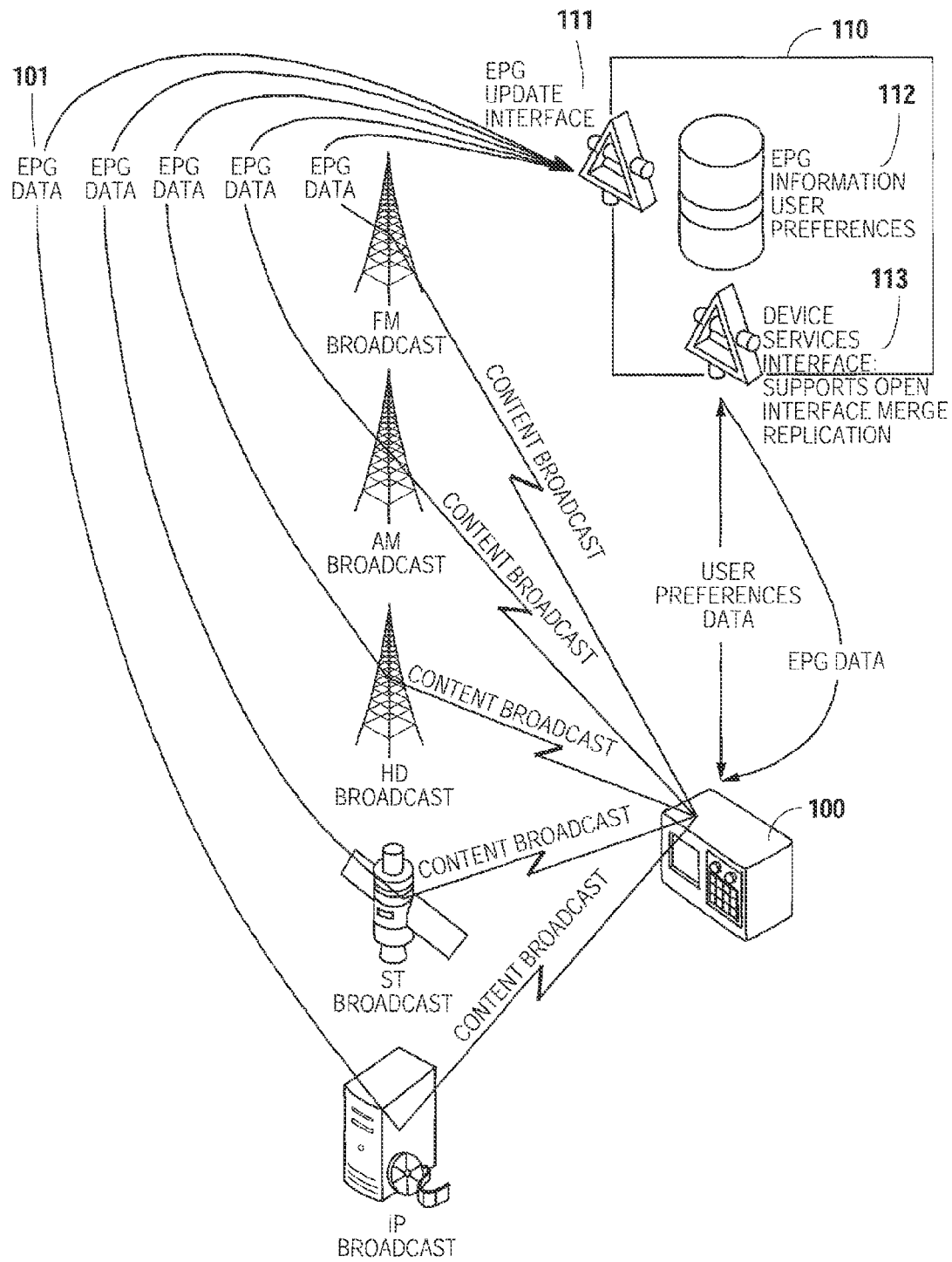
FIG. 1 is a schematic diagram of a radio system for processing broadcast streams.

As used herein, the following terms should be understood to have the indicated meanings:

When an item is introduced by "a" or "an," it should be understood to mean one or more of that item.

"AM" means amplitude modulation.

"Broadcast channel" means a communications medium having one or more properties that distinguish such communications medium from one or more other communications media. The one or more properties may include but are not limited to a particular type of medium (such as, for example, over-the-air, or cable), a particular transmission basis (such as, for example, terrestrial or satellite), a particular type of signal (such as, for example, digital, analog, or HD), a particular type of signal transmission (such as, for example, AM, FM, or IP), a particular frequency or frequency range, a particular source (such as, for example, a radio station, a computer server, or an end-user computer), or combinations thereof.

"Broadcast stream" means a communications signal representative of selected data. A broadcast stream may be transmitted over one or more broadcast channels.

"Communications signal" means a signal representative of data. A communications signal may include but is not limited to an acoustical, electrical, electromagnetic, optical, or other signal, or a combination thereof. Examples of communications signals include but are not limited to radio frequency signals, television signals, microwave signals, cellular signals, optical signals, and combinations thereof.

"Composite stream" or "CS" means a communications signal representative of data selected from a plurality of broadcast streams.

"Component" means any part, feature, or element, alone or in combination.

"Comprises" means includes but is not limited to.

"Comprising" means including but not limited to.

"Computer" means any programmable machine capable of executing machine-readable instructions. A computer may include but is not limited to a general purpose computer, microprocessor, computer server, digital signal processor, mobile phone, personal digital assistant, or a combination thereof. A computer may comprise one or more processors, which may comprise part of a single machine or multiple machines.

"Computer program" means a list of instructions that may be executed by a computer to cause the computer or another device in communication with the computer to operate in a desired manner.

"Computer readable medium" means a tangible, non-transitory article of manufacture having a capacity for storing one or more computer programs, one or more pieces of data, or a combination thereof. A computer readable medium may include but is not limited to a computer memory, hard disk, memory stick, magnetic tape, floppy disk, optical disk (such as a CD or DVD), zip drive, or combination thereof.

The term "Content Attributes" is used herein to refer to inherent or assigned characteristics of media content. Non-limiting examples of content attributes include the primary, secondary, or tertiary genre of media content provided via a media station; a tone of the content; a tempo of the content; a target media consumer group to which the content is targeted whether the content is video, audio, or multimedia; the portion of content provided via the media station is talk, news, weather, or music.

"Data" means information.

"Database" means a collection of data embodied in at least one computer readable medium and organized in a suitable way to permit a computer to select one or more desired portions of such data. In at least one embodiment, the term "Database" includes a Radio DNS® database modified according to the teachings set forth herein.

"Electronic program guide" or "EPG" means a computer program having instructions for displaying data representative of one or more broadcast streams that may be available over one or more broadcast channels. An EPG may or may not have instructions for allowing a user to navigate through data representative of a plurality of broadcast streams and to select a desired one of the plurality of broadcast streams. An EPG may or may not include a graphical user interface.

"FM" means frequency modulation.

"Having" means including but not limited to.

"HD" means of or relating to In-Band On-Channel digital signal communications. An HD signal may comprise data of any desirable type, including without limitation text, audio, or other content, such as for example text messages concerning a song title, artist name, weather forecast, weather warning, traffic update, sports score, advertiser phone number, web address, or any other customized text message readout, or any combination thereof. An HD signal may be transmitted as a substantially continuous digital data stream or an intermittent digital data stream and may be broadcast together with, or over the same broadcast spectrum as, existing AM or FM broadcast spectrums, for example. HD signals may also be multicast, or split into several broadcast channels over a broadcast spectrum.

"IP" means Internet Protocol.

"LED" means light emitting diode.

"Marks" means electronic metadata associated with an entertainment data file or broadcast stream that can be used for identifying, indexing, authentication, matching, purchasing, previewing, or organizing the received entertainment data file or broadcast stream on a receiver.

The "marks" may also be used for storing the entertainment data file or broadcast stream on the receiver or viewing information about the data file or broadcast stream, such as information about the artist or other information.

"Marking" or "marked" means a process of using a button or selector switch on a receiver to select marks for identifying, indexing, authentication, matching, purchasing, previewing or organizing an entertainment data file or broadcast stream.

"Memory" means a device that is used to store or process data, programs, instructions, or any other information on a temporary or permanent basis.

The term "or" is to be interpreted as both disjunctive and conjunctive, unless the context requires otherwise.

"Podcast" means a file, including but not limited to audio, visual, or audiovisual data, that may be transmitted or distributed over the Internet or other network in one or more user-defined time frames, such as for example through a publish and subscribe model. A podcast may be archived on the Internet or other network or may be streaming such that it is accessible by a computer or receiver automatically and may be downloaded or transmitted to the receiver or computer on demand or on a subscription basis.

"Receiver" means an apparatus adaptable for receiving a communications signal and generating a perceptible representation of such communications signal, either directly or through one or more other devices. Such perceptible representation may include but is not limited to an audible representation, a visible representation, a tactile representation, or a combination thereof. Such perceptible representation may be perceptible either with or without the aid of another device, such as, for example, an earpiece, headphone, headset, handset, viewing lens, or the like. A receiver may or may not have a speaker, display screen, light (such as an LED), vibrator, or other output device, or a combination thereof. A receiver may or may not include a computer processor, memory, or other computer components.

"RSS" or "Really Simple Syndication" means an XML format for distributing periodically updated information on the Internet or other network. RSS may be used, for example, to enable a publish and subscribe model to work in podcasting, blogging, and other websites that change or add to their content regularly.

The term "signal-quality parameters" is used to refer to characteristics of a station's signal that include packet loss, number of packet errors, bit error rate, noise, amplitude, frequency variance, and other measures of signal quality that allow a media receiver to determine whether the signal is of sufficient quality to present media content included in the signal. In at least one embodiment, signal-quality parameters are not limited to characteristics of a radio frequency (RF) carrier wave, but also include the quality of data carried by an RF carrier wave.

The term "situational parameters" is used herein to refer to a geographic location, a time of day, a day of the week, a season, a time of year, operating status and condition of vehicular systems in a vehicle, status of a personal, wide-area, cellular, satellite, or other network used to communicate with a media device, and other information that can be obtained by a media device and linked to, or associated with, another event known to the media device.

"ST" means satellite.

"Tags" means electronic metadata associated with an entertainment data file or broadcast stream that can be used for identifying, indexing, authentication, matching, purchasing, previewing, or organizing the received entertainment data file or broadcast stream on a receiver. The "tags" may also be used for storing the entertainment data file or broadcast stream on the receiver or viewing information about the data file or broadcast stream, such as information about the artist or other information.

"Tagging" or "tagged" means a process of using a button or selector switch on a receiver to select tags for identifying, indexing, authentication, matching, purchasing, previewing or organizing an entertainment data file or broadcast stream.

"Transmitter" means an apparatus adaptable for transmitting a communications signal.

U.S. patent application Ser. No. 11/499,434 filed Aug. 4, 2006, Ser. No. 11/477,156 filed Jun. 27, 2006, and Ser. No. 11/365,545 filed Mar. 1, 2006 are incorporated herein by reference. The methods discussed in those references may be used as a basis for tagging or marking broadcast files used in some embodiments. One embodiment comprises a method of allowing a user to purchase or copy a broadcast file after tagging or marking the broadcast file on a receiver. A user may be given an opportunity to purchase the broadcast file electronically. The tags or marks may indicate where the broadcast file will be purchased from or copied from, for instance, from an iTunes® web site or other web site. The tags or marks may also indicate to other users of other receivers where they may obtain a license for the broadcast file. The tags or marks may indicate the artist, title of the song, or other data associated with the broadcast file.

One embodiment as described herein is directed to a portable or desktop radio receiver adaptable for receiving one or more broadcast streams on one or more broadcast channels. Some embodiments may allow a user of a portable or desktop radio receiver to create a composite stream from a portion of one or more broadcast streams.

Figure 2:
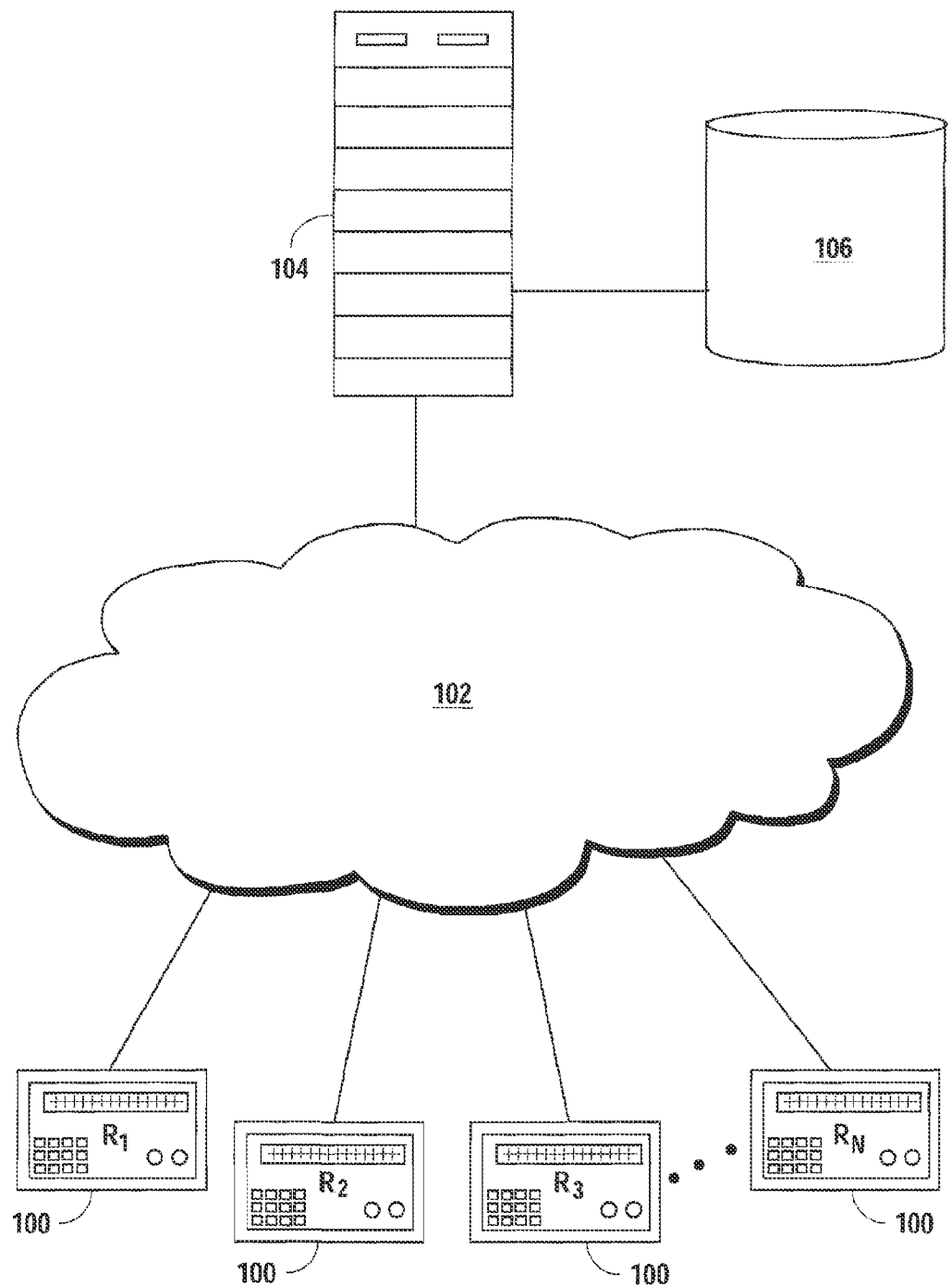
FIG. 2 is a schematic diagram of a radio system network as described herein.

Referring to FIGS. 1 and 2, a receiver 100 may comprise a computer and a memory and may be in communication with one or more sources of communications signals, such as FM, AM, HD, ST, and IP broadcast sources, for example, and one or more central computer systems 110. Each central computer system 110 may include but is not limited to a computer 104 and a data storage device 106 in communication with computer 104. Although only one computer 104 and data storage device 106 are shown in FIG. 2, more than one computer 104 and data storage device 106 may be provided. As shown in FIG. 2, a receiver 100 (indicated as R.sub.1 . . . R.sub.N) may be in communication with computer 104, either directly or via a network 102, which may include but is not limited to the Internet. Each receiver 100 may be capable of receiving communications signals over one or more broadcast channels from the various broadcast sources, such as the FM, AM, HD, ST, and IP broadcast sources shown in FIG. 1, as well as one or more composite streams (CS) from one or more central computer systems 110 as described further below. Each receiver 100 may also have a transmitter adaptable for transmitting communications signals to computer 104 of one or more central computer systems 110 as described further below. The communications signals transmitted between and among the broadcast sources, receivers 100, and one or more central computer systems 110 may include primary data, such as songs, advertisements, talk shows, game shows, DJ chatter, news reports, weather reports, traffic reports, and sports reports, for example, as well as ancillary data, such as EPG data 101, for example.

In some embodiments, EPG data 101 may contain metadata information within broadcast streams, such as radio, television, satellite, and Internet broadcast streams. EPG data 101 may include but is not limited to metadata information such as station names, station call signs, broadcast frequencies, broadcast channel types, broadcast stream types, program titles, album titles, song titles, artist names, genres, durations, start times, end times, affiliated and non-affiliated station carriers, keyword(s), and other metadata information relating to one or more broadcast streams. One or more central computer systems 110 may include various computer program applications, such as an EPG update interface 111 and a device services interface 113 to facilitate open interface merge replication as described further below. Data storage device 106 of one or more central computer systems 110 may be used to store various data, such as EPG data 101 and user preference data.

In some embodiments, a receiver 100 may have the capacity to receive and display EPG data 101 and to tune, browse, capture or download a selected broadcast stream on an available broadcast channel using metadata information from an EPG. For example, receiver 100 may be programmed to browse EPG data 101 such as station call signs, and a user may select a certain station call sign such as "KISS FM," for example. The receiver 100 may then be tuned to the user selected station, having the call sign "KISS FM."

The receiver 100 may include volatile memory storage to be used as a buffer for real time listening, providing the receiver 100 the ability to rewind, pause, and fast forward up to a desired point. The receiver 100 may also incorporate an EPG to enable a scheduled recording of one or more selected broadcast streams or enable an immediate recording of real time programming. In some embodiments, a receiver 100 may have the capacity to receive and display EPG data 101 and to tune, browse, capture or download a selected broadcast stream on an available broadcast channel. A broadcast stream may be selected manually or according to predefined rules. For example, receiver 100 may be programmed to attempt to tune in to a selected broadcast stream over a selected broadcast channel, and if the selected broadcast stream is not available on the selected broadcast channel, receiver 100 may then attempt to tune in to the selected broadcast stream over an alternative broadcast channel. Receiver 100 may be programmed to continue to search for the selected broadcast stream on successive alternative broadcast channels according to one or more rules of priority, which may be predetermined or established by a user, until the selected broadcast stream is found or all available broadcast channels are exhausted. For example, a user may select a certain radio station, such as KISS FM, and receiver 100 may be programmed first to seek the KISS FM station on an HD FM broadcast channel, and if that fails then seek that station on a regular FM broadcast channel, and if that fails then seek that station on an IP broadcast channel. Of course, any desired rules of priority may be used, and the foregoing example is merely illustrative. Receiver 100 may be programmed such that if the selected broadcast stream is not available on any of the available broadcast channels, then receiver 100 may display a message or produce a signal indicating that the selected broadcast stream is not currently available, tune in to a default or alternate broadcast stream, or go into a sleep mode. The default or alternate broadcast stream may be determined according to user preference data, such as a preferred genre, for example. Receiver 100 may also be programmed such that if the selected broadcast stream is not available on any of the available broadcast channels, then receiver 100 may allow the user to select comparable broadcast streams.

Some embodiments may include a database that may store the availability of various broadcast streams on various broadcast channels. The database may be stored locally in a memory in receiver 100, remotely in data storage device 106, or in both of those locations. In various embodiments, the database may contain data for all available broadcast streams in a given geographic area. Using a receiver 100, a user may browse or tune to all broadcast streams accessible in a user selected geographic area. For instance, a user may program a receiver 100 to search for broadcast streams in a certain zip code. The receiver 100 may access the database stored locally in a memory in receiver 100, remotely in data storage device 106, or in both of those locations to determine all broadcast streams on various broadcast channels available in the selected zip code. Additionally, broadcast streams and broadcast channels may be searchable using the database based on a selected city, state, or distance from receiver 100. Other embodiments may allow a user to search for all broadcast streams and broadcast channels using the database based on the IP address of receiver 100, the GPS location of receiver 100, positional information of receiver 100, or other geographic location of the receiver 100.

Some embodiments allow a receiver 100 to upload data of various broadcast streams on various broadcast channels in a given geographic area to the database in order to effectively populate the database for the benefit of all users. For instance, if a user in San Antonio, Tex. tunes his or her receiver 100 to a selected broadcast stream over broadcast channels HD or FM, such user may upload the data from his or her receiver 100 to the database to benefit all other users in San Antonio, Tex. seeking to tune to the selected broadcast stream. If a second user using another receiver 100 travels to San Antonio, Tex., the second user's receiver 100 may download data from the database to locate the same selected broadcast stream over broadcast channels HD or FM. Of course, the same upload and download processes may be applied to any available broadcast channel, not merely HD or FM. The upload and download processes may be automatic or upon request. Uploading of data to the database may enable multiple users to share data about broadcast streams, broadcast channels, and user preferences among a plurality of receivers 100. For example, a local user in Rome, Italy may upload data to the database from that user's receiver 100 allowing a tourist user traveling in Rome, Italy, for instance, to download data from the database. The tourist may then tune to all available broadcast streams over various broadcast channels in Rome. As another example, a user in New York City may discover a new broadcast stream not previously stored in the database. The user may upload the newly discovered broadcast stream data to the database and allow other New York City users to tune to the newly discovered broadcast stream after downloading the data from the database.

Other embodiments may allow a user of a receiver 100 to automatically download data from the database at periodic intervals. A user may also manually download data to receiver 100 from the database. Receiver 100 may take various forms, such as a desktop device or a mobile handheld device. Some embodiments may include user preferences that may be stored in the database such that a user preference stored for a desktop receiver may be transferred to a mobile handheld receiver, or vice versa.

Each broadcast channel may have a theoretically unlimited number of broadcast streams using that broadcast channel as a transport mechanism. Broadcast streams may interact with a system as described herein in at least three ways:

1. EPG Data Upload—EPG data from each broadcast stream may be uploaded to central computer system 110 via an EPG update interface on a regular or otherwise determined basis. The composite of this information from all broadcast streams across all broadcast channels may form a master EPG, which may be stored on data storage device 106.

2. Content Broadcast—The content of a broadcast stream may be broadcast by a source and picked up by a receiver 100 using, for example, its multi-channel receiver functionality.

3. Backchannel Reporting—A receiver 100 may report backchannel data to one or more central computer systems 110 concerning one or more broadcast streams received by receiver 100. This backchannel data may include, but is not limited to, listener play information, such as information about the particular content played, the types of content played, when the content is played, where the content is played, and so forth. Such backchannel data may be used by broadcasters to provide particular information targeted to certain listeners or geographic areas in future broadcasts.

Persons of ordinary skill in the art will recognize that various data may be stored in various locations and in various formats in a system as described herein. For example, desired playlist data may be stored in memory on one or more receivers 100 and on data storage device 106, and the formats in those locations may not be the same. To facilitate the use of such data in an orderly manner, a method of open interface merge replication ("OIMR") may be used. In such a system, certain data elements may at times be updateable in a variety of locations, such as, for example, on one receiver 100, another receiver 100 used by the same user, or data storage device 106, and those devices may not use the same data format. Also, of those devices, the situation may be such that no one data store is necessarily the "master," that is, the device whose information prevails if a conflict exists.

Figure 3:
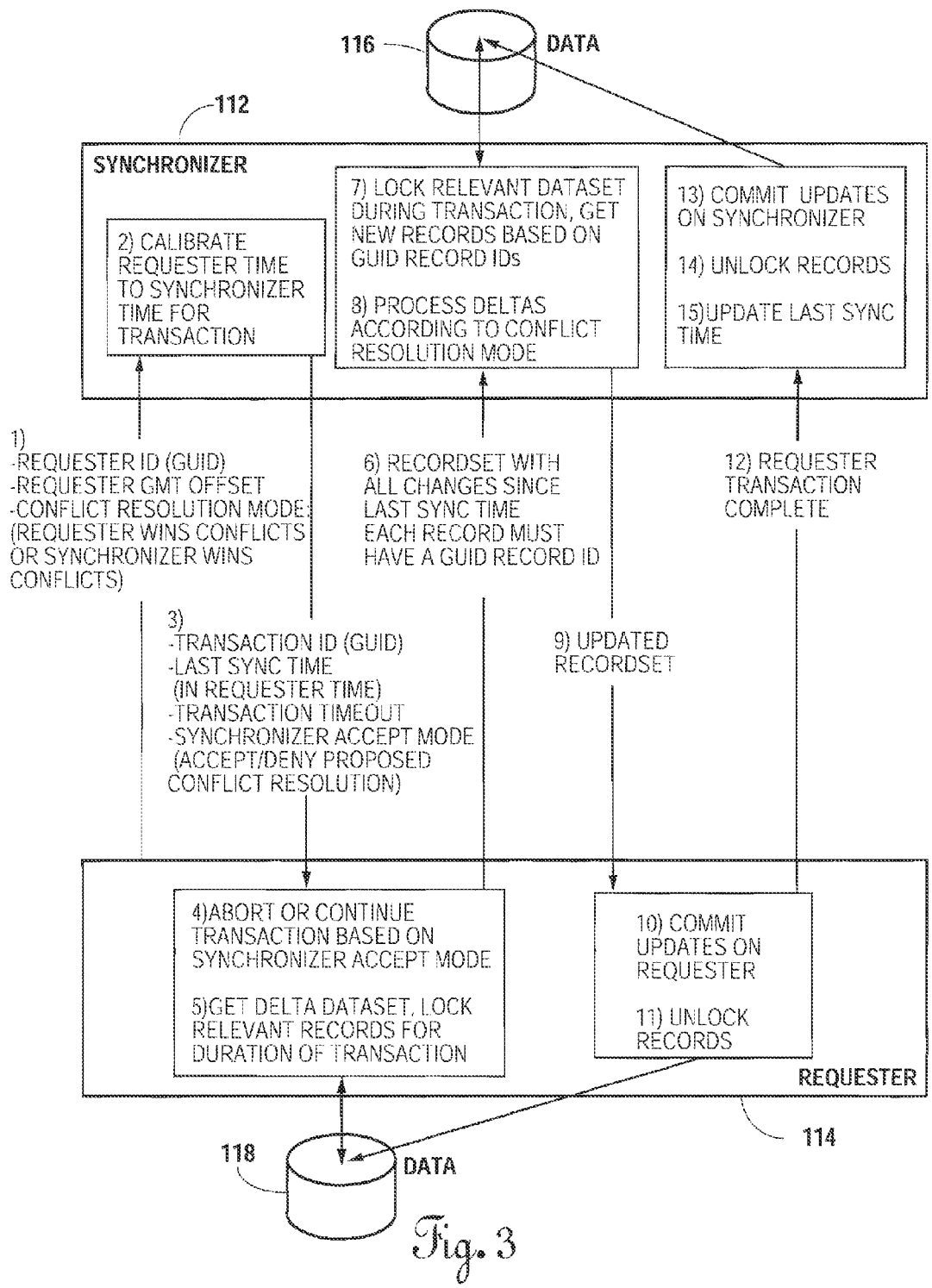
FIG. 3 is a schematic diagram that illustrates one embodiment of an open interface merge replication process.

FIG. 3 illustrates one embodiment of a method of OIMR. This method may allow two or more devices or databases 118 and 116, such as a memory of receiver 100 and data storage device 106 of one or more central computer systems 110, respectively, to be synchronized with each other as "requester" 114 and "synchronizer" 112. These devices may be able to store data locally, access data stored elsewhere, or both. Further, the data may or may not be of the same format. Such a solution may typically be oriented toward the synchronizer 112 being the master, but that need not be the case. The conflict resolution mode may be set as desired such that either the requester 114 or the synchronizer 112 wins any conflicts or "deltas" that are identified. The processing logic may be divided between the requester 114 and the synchronizer 112 in any relative amounts as desired. For example, a majority of the processing logic may be performed on whichever device is selected as the master. Depending on the particular situation, not all of the steps listed in FIG. 3 may be necessary, or additional steps may be included if desired.

Still referring to FIG. 3, a method of OIMR may involve a plurality of steps indicated as 1-15. For example, a requester 114 may request an update from a synchronizer 112, such as by sending a ping to a server. Such a request may be made, for example, manually, electronically, automatically or otherwise from time to time. In return, the synchronizer 112 may compare the data on the two devices and determine the differences, if any. Whether or not any differences or "conflicts" exist, the synchronizer 112 may then communicate an update of data to the requester 114, which may be accepted or rejected, for example, in accordance with predetermined instructions. On the other hand, the requester 114 may at times act as the master, such that any conflicts may be resolved in its favor. The data involved herein may include, for example, time settings, play lists, EPG information, records, record sets or other data or portions thereof. The data, transactions, and/or devices involved in OIMR may be uniquely identified, such as by assigning a globally unique identifier ("GUID") to each of them, in order to sufficiently distinguish the different pieces of data.

Referring again to FIG. 3, a method of OIMR may have a plurality of applications. For example, a receiver 100 may allow a user to arrange a "preset" such that the user may quickly recall a favorite broadcast stream with the push of a button. However, the user may have a second receiver 100 at home or another location with a different preset or may choose a different preset through a web interface provided by one or more central computer systems 110 shown in FIG. 1. In such a situation, for example, the user may wish that any changes to a preset made via the web interface automatically take effect on the home receiver(s) as well. Thus, questions may arise, for example, as to which user settings control, or whether the home receivers are affected by changes made elsewhere. A preset may be bi-directional. For example, a preset may be set on a local receiver and pushed up to a centralized server, or such preset may be set on a centralized server via a web site and pushed to a local receiver or other devices. A local database on a receiver may be incrementally updated such that a given update may not necessarily replace all of the database but may only update the difference in versions as needed or desired between the local database and a centralized database, for example. Each radio station, such as over the air (OTA), Internet, and HD2, for example, may be given a unique ID—for example, a KOGA-FM OTA station may have a different station ID than a KOGA streaming Internet station, and a KOGA HD2 station may have a different station ID than the OTA station and the streaming Internet station. While a preset is used herein as an example, other types of data, content or instructions may also be changed on various system components and in a variety of ways. Thus, changes or updates may be made to similar data in a plurality of locations.

Receiver 100 may be programmable to perform time shifted playback, in which a user may save some data to a local storage device on receiver 100 and play that content at a later time. Receiver 100 may also be programmable to allow a user to create personal playlists and send such playlists to another user, such as through the database discussed herein. Receiver 100 may also be programmable to allow a user to create a composite stream and distribute that composite stream, or an EPG for that composite stream, to others.

Figure 4:
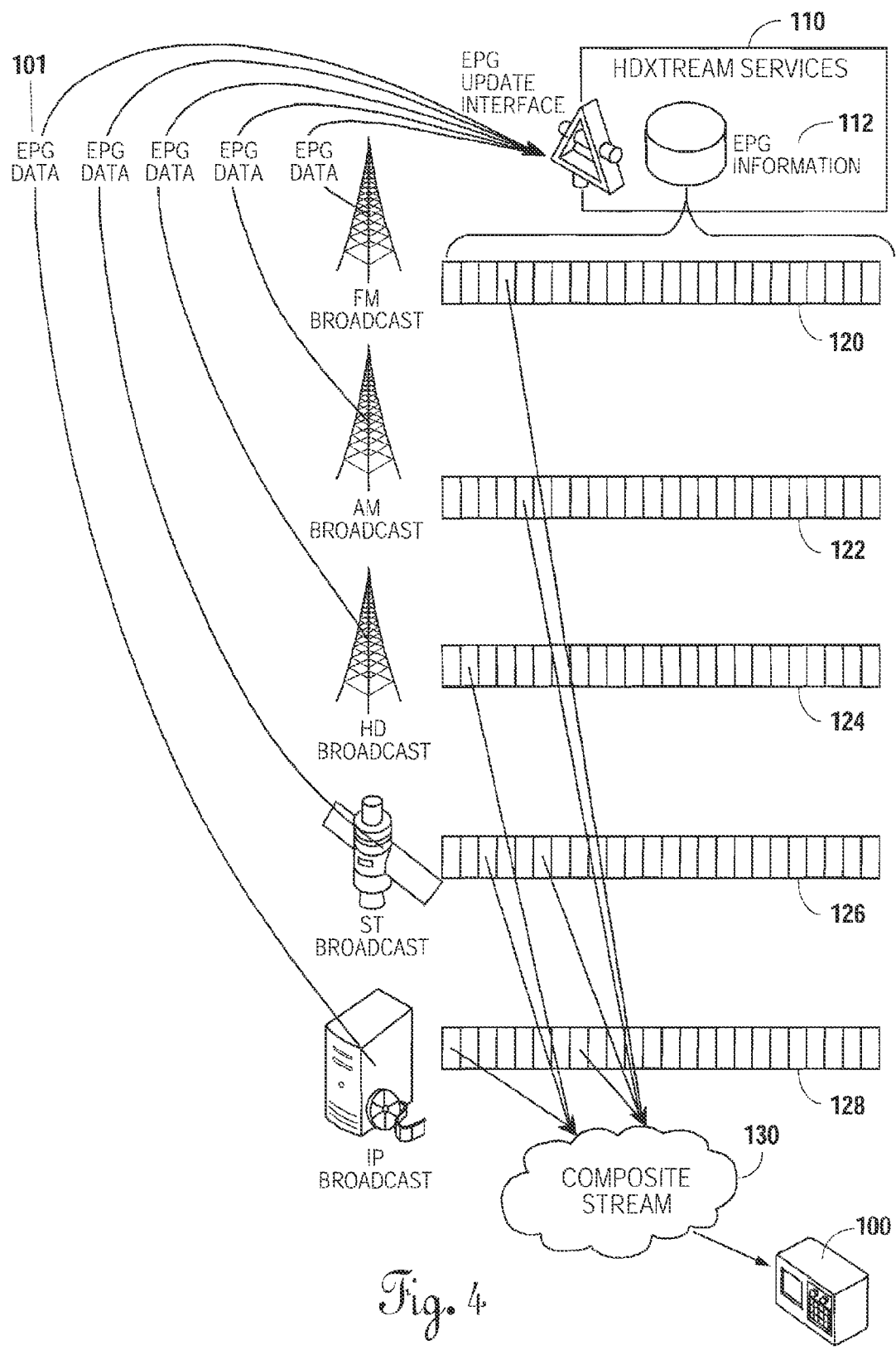
FIG. 4 is a schematic diagram that illustrates one embodiment of an EPG-based composite stream as described herein.

FIG. 4 illustrates the creation of an EPG-based composite stream 130 that comprises one or more pieces of data selected from one or more broadcast streams 120, 122, 124, 126, and 128. This functionality of receiver 100 may allow a user to create a unique "station" and to share it with others without having to have access to the physical equipment of the source of a broadcast channel or broadcast stream. For example, a user may compile a unique play list including his or her favorite streams or songs and may share that play list with others. Further, a user may, for example, record a series of selected songs from a variety of broadcast streams and may then have the ability to share that recording with other users. Composite streams may provide an avenue for the publication of a wide variety of specialized and unique broadcast streams without the need for additional broadcast channel infrastructure. This may create an environment for low cost experimentation with new data formats and also economic viability for niche content, or data, formats.

Figure 5:
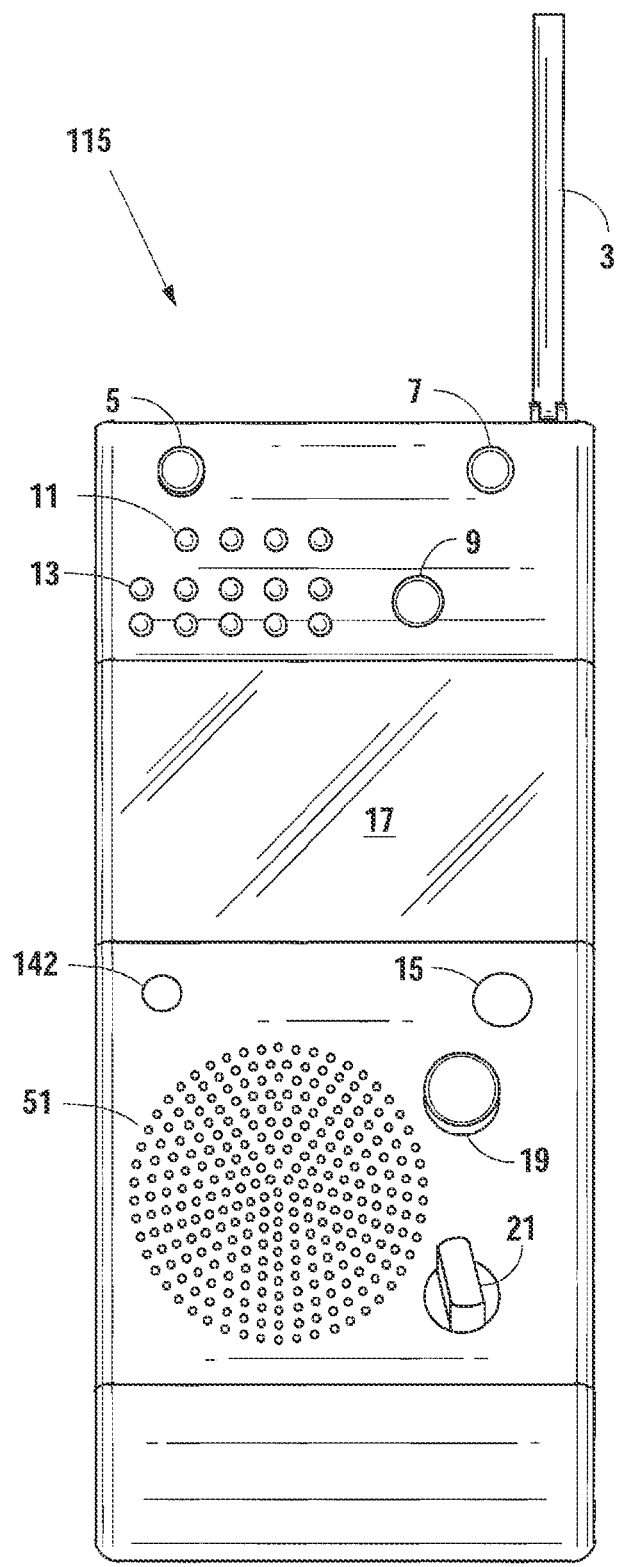
FIG. 5 is a front elevational view of a radio receiver.
Figure 6:
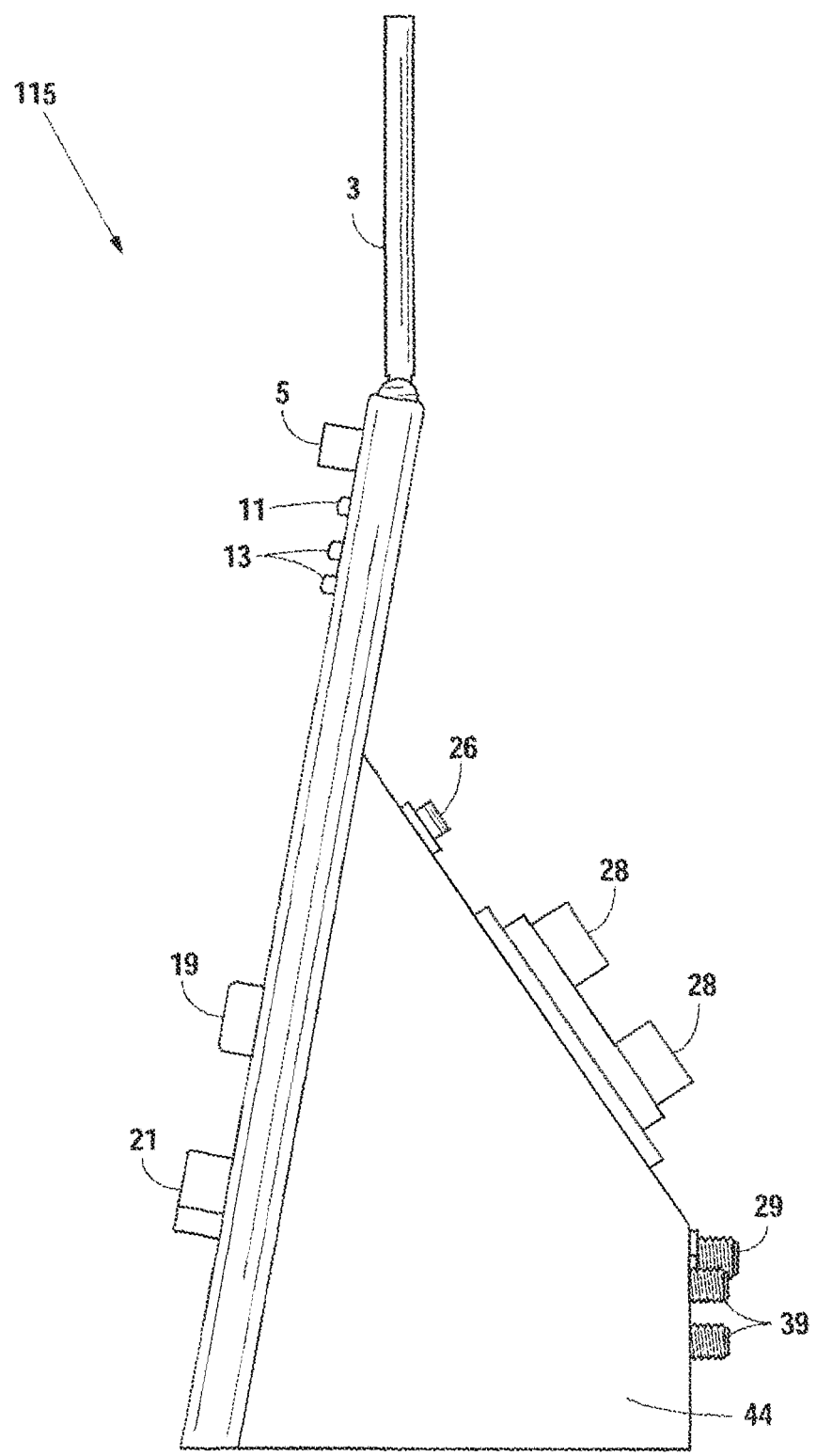
FIG. 6 is a left side elevational view of the radio receiver of FIG. 5.
Figure 7:
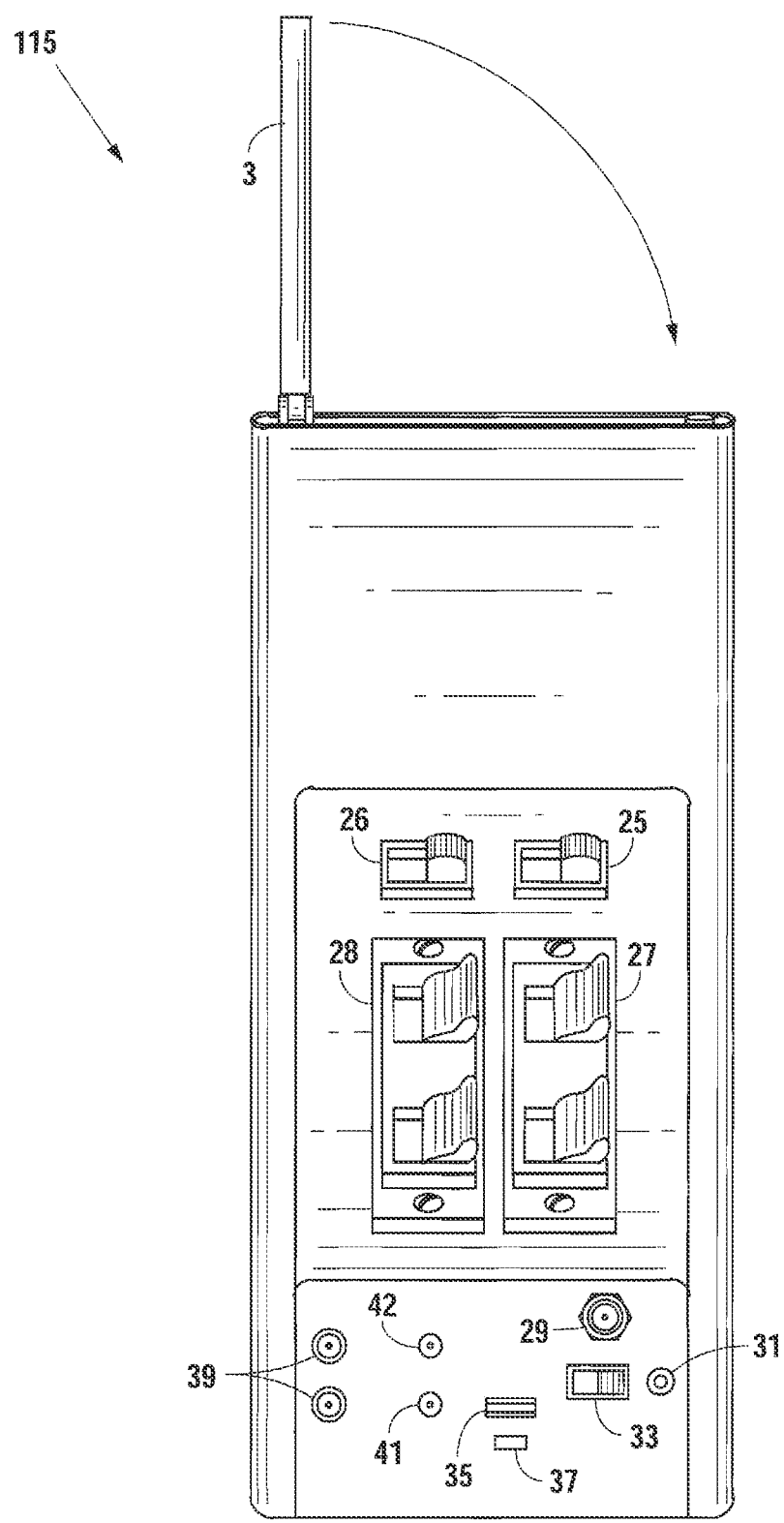
FIG. 7 is a back elevational view of the radio receiver of FIG. 5.

Receiver 100 may take various forms, such as a desktop device or a mobile handheld device that may dock in a car, at home, or runs off of a battery. Receiver 115, an embodiment of receiver 100, is illustrated in FIGS. 5-7. Receiver 115 may have one or more N/W/T/S presets 11 for news, weather, traffic and sports. A user may create a playlist of one or more N/W/T/S presets 11, for instance, a sports playlist for sports broadcast streams in Dallas, Tex. In some embodiments, one or more N/W/T/S presets 11 may include broadcast streams targeted to school closings, or lunch menus at schools in a geographic area, for example. In other embodiments, one or more N/W/T/S presets 11 may include traffic data from various traffic services. A user may program which traffic routes and other data they are most interested in and the receiver 115 may display the data or traffic routes in either a text or graphical manner. Targeted news, weather, traffic and sports may therefore be broadcast to a receiver 115 based on a user's configuration.

Still referring to FIGS. 5-7, a receiver 115 may also include one or more channel presets 13; a tuning knob 19 for controlling tuning of receiver 115 while playing over the air (OTA) signals or Wi-Fi signals; a volume and on/off knob 21; an infrared (IR) window 7 for communicating wirelessly with other communications devices; a record button 9 for recording data on receiver 115; a mute switch 15 for muting receiver 115; a display 17 for displaying information; an internal speaker 51 for playing sound; an alarm button 5 for activating or disabling a user configured alarm; and an included antenna 3 for receiving broadcast streams. Included antenna 3 may be a telescoping or other suitable type of antenna. Alternatively or additionally, an internal antenna may be provided. A snooze button (not shown) may also be included on the receiver 115.

Most radio alarms may only be configured to assign a buzzer or an FM or AM broadcast channel as the alarm sound. If the FM or AM broadcast channel is weak, the alarm sound may be radio static instead of the selected broadcast stream. In one embodiment, a receiver 100 may be programmed to assign a recorded playlist as the alarm sound. The receiver 100 may also be programmed to assign a user selected broadcast stream whereby if an FM or AM broadcast channel is weak, the receiver 100 may search for an alternative broadcast channel such as an HD or IP broadcast channel, for example. The receiver 100 may also be programmed to assign a default buzzer as the alarm sound. In some embodiments, the receiver 100 may be programmed to assign a podcast as the alarm sound. Other receivers 100 may include an alarm that can be programmed for dayparting, wherein at least two alarm settings, for instance from Monday to Friday, and Saturday to Sunday, are set.

Referring again to FIGS. 6 and 7, receiver 115 may include an FM antenna switch 25 to allow a user to select between the included antenna 3 or an external antenna (not shown); an AM antenna switch 26 to allow a user to select between the included antenna 3 or an external antenna (not shown); a 300.OMEGA. FM antenna connection 27; an AM antenna connection 28; a 75.OMEGA. FM antenna connection 29; a power connector 31; a network port 33; a wireless network port 35; a USB connector 37 for providing power and/or data to the receiver 115; line in/line out jacks 39 to allow the receiver 115 to connect to other audio/video sources or external speakers or other output devices; a headphone jack 41; an iPod adapter 42 to allow the receiver 115 to broadcast a communications signal from an external iPod; and a base 44. Network port 33, USB connector 37, and wireless network port 35 may be provided to allow the receiver 115 to connect to the Internet or other suitable network. Additionally, a receiver 115 may contain an internal wireless adapter to connect to the Internet or other suitable network. USB connector 37 may also be used to connect the receiver 115 to a computer to output sound or data from the receiver 115 to a computer's speakers or other suitable device. USB connector 37 may also be used to connect a computer to the receiver 115 to output sound from the computer to the internal speaker 51 of the receiver 115.

Referring again to FIG. 5, in some embodiments, a channel selector switch 142 may be included in the receiver 115 for manually selecting one or more broadcast channels, such as AM, FM, HD, or Wi-Fi, for example. Other embodiments may seamlessly switch between available broadcast channels without any manual selection. For instance, HD digital and IP broadcast channels normally have a time delay in broadcasting the communications signal. A receiver 115 may first select broadcast channels FM or AM after a user selects a broadcast stream, then automatically switch to an HD digital broadcast channel to avoid any time delay. Alternatively, a user may manually force a receiver 115 to a certain broadcast channel using channel selector switch 142. For instance, a user may be located in a building with poor FM or AM reception. Therefore, a user may program the receiver 115 to only tune to broadcast channels such as Wi-Fi or other Internet broadcast channels, for example.

Some broadcast channels or broadcast streams require a subscription or payment of some form to receive and use the broadcast stream or broadcast channel. For instance, some satellite radio stations require subscriptions to receive their broadcast stream. Many conditional access broadcast streams or broadcast channels use NDS technology to encrypt the signal, and typically require some form of a pass card or ID to enable the broadcast stream or broadcast channel. Of course, other forms of identification may be used to enable the broadcast stream or broadcast channel. In one embodiment, a receiver 100 may access conditional access broadcast streams or broadcast channels by using a pass card or ID. The receiver 100 may also support downloading podcasts directly to the receiver 100 based on standard RSS subscription processes or other suitable methods. In an alternative embodiment, a receiver 100 may allow a broadcast stream to be marked or tagged by the user as a purchase interest. The receiver 100 may include a tag button (not shown) that allows the user to mark or tag a broadcast stream or file received or played by the receiver 100. The marks or tags may then be saved on the receiver 100 and transmitted to the respective retail service such as iTunes®, Amazon®, or Zune Marketplace™, for example, for purchase, preview, indexing, or downloading to the receiver 100.

Figure 8:
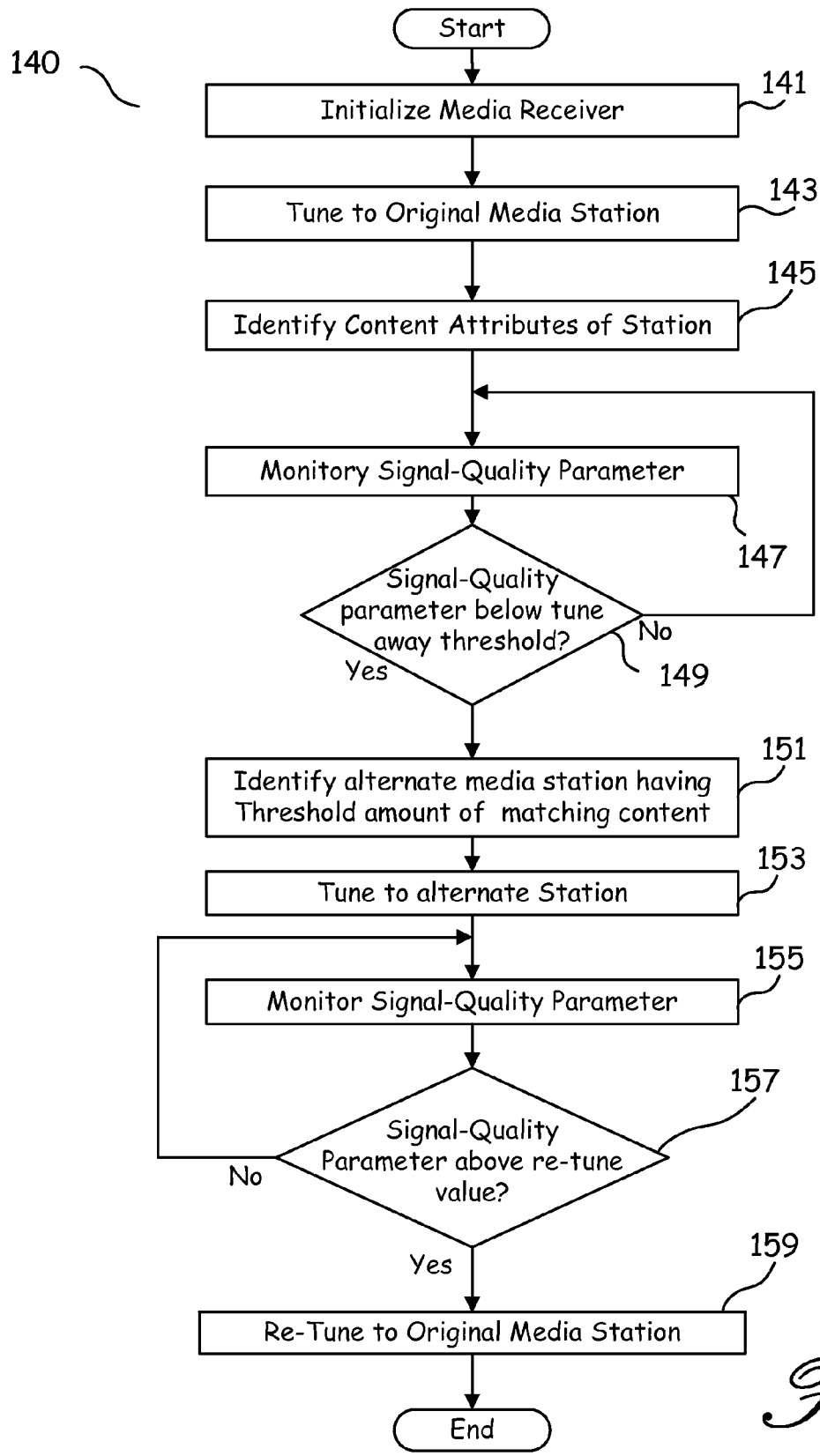
FIG. 8 is a flowchart illustrating a method of mitigating media station interruptions according to various embodiments of the present disclosure.

Referring next to FIG. 8, a flowchart illustrating a method 140 of mitigating media station interruptions will be discussed according to various embodiments of the present disclosure. Method 140 can, in some embodiments, minimize interruptions to a media consumer by using the ability of receiver 115 (FIG. 5) to seamlessly switch between available broadcast channels without requiring a user to manually tune the media receiver. In some embodiments, the switch between available broadcast channels can include switching from an affiliated station to a non-affiliated station. Transferring from an affiliated station to a non-affiliated station is sometimes referred to herein as "forwarding."

Method 140 begins by initializing a media receiver, as illustrated by block 141. Initializing the media receiver can include connecting to network or internal databases storing various items of historical information, which can be used by the media receiver to select an initial or original media station. Note that in some implementations, there is no need to consult a database during media receiver initialization, because the last station tuned-to can be selected as the original station. A method of determining the original station will be discussed in more detail subsequently, with respect to FIG. 10.

As illustrated by block 143, the media receiver can tune to the original media station selected during media receiver initialization at block 141. If the last station tuned-to is selected as the original media station during receiver initialization, block 143 can be omitted in some embodiments.

As illustrated at block 145, the content attributes of the currently-tuned media station, can be identified. The content attributes can include, but are not limited to, metadata information such as station names, station call signs, broadcast frequencies, broadcast channel types, broadcast stream types, program titles, album titles, song titles, artist names, genres, durations, start times, end times, affiliated and non-affiliated station carriers, keywords and other information included in EPG data 101 (FIG. 1).

As illustrated by blocks 147 and 149, signal-quality parameters of a currently-tuned media station can be monitored and tested to determine whether the signal-quality parameters have dropped below a threshold level, sometimes referred to herein as a tune-away threshold. The tune-away threshold refers to a level of signal quality sufficient for a media receiver to reproduce media content at a quality that is estimated to be satisfactory to a media consumer. In some embodiments, these signal-quality parameters can be linked to characteristics of either or both of a physical transmission medium or a logical transmission channel. Signal-quality parameters can include, but are not limited to, an ability of the media receiver to receive a media signal, signal-to-noise ratio (SNR), amplitude and amplitude variations, frequency and frequency variations, a bit-error-rate (BER), a packet error rate (PER), transmission lag, or the like. Thus for example, in some embodiments if a media receiver cannot maintain a lock on a radio frequency (RF) carrier signal used to transmit media content, the signal-quality parameters of that signal can be deemed to have dropped below the tune-away threshold. Likewise, if the SNR falls below the operating capabilities of a media receiver, or if the number of packets lost degrades the ability of the media receiver to reconstruct either or both intelligible audio or video, the signal-quality parameters can be said to have fallen below the tune-away threshold.

The actual tune-away threshold for various parameters, for example the exact SNR used to determine when a tune-away should occur, can be determined based on various factors, including hardware limitations in a media receiver, such as a minimum SNR needed for a local oscillator circuit to obtain a frequency lock, and software limitations, such as the ability of the software to interpolate, decode, or reconstruct media items when some of the packets have been lost or corrupted. In other cases, the tune-away threshold can be determined empirically based on studies indicating a minimum acceptable quality level. Yet other embodiments allow an end user to adjust one or more tune-away threshold values by altering a value of a component in a tuned circuit using an adjustment knob or button, or by setting or changing a variable via a web browser or other graphical user interface. Regardless of how the threshold values are determined, the current measured or estimated value of one or more signal-quality parameters can be compared to the corresponding threshold value to determine whether or not to tune-away from the current stations and tune-to an alternate station.

If the determination at block 149 indicates that no tune-away is to occur, that is, if the one or more signal-quality parameters have not dropped below the tune-away threshold, method 140 can continue to monitor the signal-quality parameters. If, however, the signal-quality parameters have dropped below the tune-away threshold, an alternate media station can be identified at block 151.

The alternate media station is, in some embodiments, the station to which the media receiver will automatically tune, in response to a tune-away event. In some embodiments, the decision about which media station to choose as the alternate media station can be made by performing a comparison of the content attributes of the original media station to the content attributes of the station being considered for the alternate media station. In some such embodiments, a simple comparison of the number of matching content attributes can be used to make the determination, and determining if that number meets a threshold number. For example, if 5 content attributes are being compared, the threshold amount of matching content can be set to 3 out of 5 matching content attributes. In some embodiments, the content attributes can be weighted, and the threshold amount of matching content can be determined based on a weighted combination of content attributes. For example, if five content attributes are given weights that total to 100% as follows: content attribute 1=30%; content attribute 2=24%; content attribute 3=18%; content attribute 4=15%; and content attribute 5=13%. In the same example, the threshold amount of matching content can be set to 51%. Thus, two matching content attributes will meet the threshold amount of matching content as long as one of those two is content attribute 1. However, no other two content attributes will reach the threshold of 51% by themselves. Likewise in the current example, three matching content attributes, other than content attribute 1, will be sufficient to match the threshold amount of matching content if as long as content attribute 2 is one of the three matching content attributes. Note that even if content attributes 3, 4, and 5 all match, they still fail to reach the required threshold.

Other methods of determining how similar content of the alternate station is to content of the original station can be used, and appropriate thresholds set. For example, in some embodiments, various techniques used to select media similar to a user's preferred media content can be used. Thus, if the original station plays a large quantity of music by ZZTop, and an alternate station plays a large quantity of Lynard Skynard songs, the two radio stations can still be considered to have matching content if the similar-media-selection technique indicates that a listener who prefers ZZTop will still enjoy Lynard Skynard.

Various embodiments can take into account whether or not an alternate media station is an affiliate of the currently tuned-to media station, and prefer an affiliate station to a non-affiliate station when selecting the alternate media station. Information identifying the affiliation status of a particular media station can be stored along with information about the content attributes of a particular station, and can even be treated as one of the content attributes when determining a threshold amount of matching content. For example, if both an affiliate media station and a non-affiliate media station are being considered for selection as the alternate media station, and both stations have a similar amount of content in common with the currently tuned-to media station, the affiliate media station can be given preference over the non-affiliated media station. In some implementations, an affiliate station with less content in common with the currently tuned-to media station than a non-affiliate station can still be selected over the non-affiliated station, as long as the amount of content in common with the currently tuned-to station differs by less than an acceptable difference threshold amount from the amount of common content in the non-affiliated station.

Consider, for example, an affiliate station having a 65% content match with a currently tuned-to station, and a non-affiliate station having a 70% content match with the currently tuned-to station. If the acceptable difference threshold is set to 4%, then in this example, the non-affiliate station would be chosen over the affiliate station, because the there is more than a 4% difference between the amount of common content in the affiliate and non-affiliate stations. If, however, the acceptable difference threshold is set to 6% in this example, then the affiliate station would be chosen over the non-affiliate station.

In various embodiments, selection of the alternate media station at block 151 is done well in advance of the signal-quality parameters dropping below the tune-away threshold. For example, selection of an alternate media station can begin as soon as the content attributes of the original media station have been identified at block 145. In some cases, a table, list, relational database, or other data structure associating media stations having similar content can be stored in a memory of the media receiver, or obtained from a network EPG server.

The alternate media station may be of the same broadcast source type. For example, if the original station is an FM station, the alternate station can also be an FM station. However, in some embodiments, the alternate station can be of a different broadcast source type. For example, if the original station is an HD radio station, the alternate station can be an FM station, an AM station, and Internet radio station, a media stream from a locally connected media player, an Internet radio station received from a smart phone connected to the media receiver via a personal area network, or the like.

Regardless of how the alternate station is selected at block 151, the media receiver can automatically tune to the alternate station, as illustrated by block 153, in response to one or more monitored signal-quality parameters falling below the tune-away threshold. Tuning to the alternate station can include switching from one tuner included in the media receiver, for example an AM tuner, to another tuner included in the media receiver, for example an FM tuner. Likewise, tuning to the alternate station can include the media receiver changing from an HD radio tuner to a cellular radio section included in the media receiver, so that a streaming media station provided via a wide area network can be received and presented to the end user. Additionally, tuning to the alternate station can include switching from an internal input source to an external input source so that an external receiver connected to the media receiver via a personal area network, can be used as the source of the media station. In some embodiments, tuning to an alternate radio station can include forwarding to a non-affiliated station by using signaling techniques described herein, some of which may also be used by Radio DNS®, an open standard proposed by a collection of radio broadcasters and manufacturers. For example, if an alternate station is a streaming station, the streaming station can be notified to begin streaming content to a user's radio receiver.

In at least one embodiment, one or more signal-quality parameters of the original station can continue to be monitored while the media receiver is tuned to the alternate media station, as illustrated by blocks 155 and 157. If the signal-quality parameters of the original station rise above the re-tune values, then the media receiver can tune away from the alternate station back to the original station, as illustrated at block 159. In some embodiments, the re-tune threshold values are different than the tune-away threshold values. For example, if a tune-away SNR threshold is set to 8 dB, the re-tune threshold might be set to 9.5 dB, so that there is sufficient margin to prevent the media receiver from oscillating between the original station and the alternate station.

Referring next to FIG. 9, a flowchart illustrating a method 160 that uses a history of signal-quality parameters associated with particular geographic locations or times to mitigate media station interruptions will be discussed according to various embodiments of the present disclosure.

As discussed previously with respect to FIG. 8, signal-quality parameters can be monitored to determine when a tune-way event or a re-tune event is going to be performed. As illustrated by block 161, a history of signal-quality parameters can be recorded and stored in a local, external, or networked memory location.

As illustrated at block 163, the signal-quality parameters are associated with one or more of geographic area, time of day, day of the week, time of the year, etc. In at least one embodiment, this association can be made at the time the signal-quality parameters are recorded. For example, a media receiver can be set up to record out of the ordinary occurrences, such that any time one or more signal-quality parameters drops below a threshold level, the value of the deviating signal-quality parameter can be recorded along with the geographic location, time, and date. The geographic location information can be obtained from any of various sources, such as a GPS unit included in or connected to the media receiver, or calculated by the media receiver itself based on user input, information received from a cellular device, information received at the media receiver via the Internet, information embedded in station metadata, or some combination of this and other information.

As illustrated at block 165, the media receiver can determine current location and time parameters. Using the current location and time parameters in conjunction with stored history of signal-quality parameters, a determination can be made about whether or not one or more signal-quality parameters are anticipated to fall below threshold parameters, as illustrated by block 167. For example, consider the situation in which a user's media receiver is affixed to his vehicle, and the vehicle passes through a radio signal dead zone most weekdays between 7:30 am and 7:53 am, and that passing through this dead zone causes one or more signal-quality parameters to decrease below their tune-away threshold. The decrease in the signal-quality parameter can be recorded and associated with the time period between 7:30 am and 7:53 am weekdays. If the current time is 7:15 am on a Monday, the media receiver can determine at step 167 that a decrease in signal-quality parameters below the tune-away threshold is upcoming. Similar determinations can be made based on the season, for example if the user in the previous example commutes to college during the spring and fall, but not during the summer, the determination can take that into account. Thus, a determination made regarding signal-quality parameters on Monday, July 5 at 7:15 am may not yield the same result as a determination regarding signal-quality parameters on Monday, February 23 at 7:15 am.

Similarly, geographic location can be used to make the determination, so that if the history indicates that when the media receiver reaches a particular geographic location the signal-quality parameters decrease below the tune-away threshold. An even more accurate prediction can be made by taking into account both time and geographic location parameters. Consider, for example, that the station being monitored is a streaming Internet radio station that experiences heavy interference causing SNR parameter drops near a downtown building only at 9 pm on non-holiday Mondays. If the user is travelling near that building at 8 pm on a non-holiday Monday, it is unlikely that signal-quality parameters will decrease below the tune-away threshold. Similarly, the determination made at block 167 is unlikely to be yes at 9 pm on a Tuesday.

If it is determined at block 167 that one or more signal-quality parameters are anticipated to decrease below their threshold values, appropriate action can be taken. For example, a check can be made at block 169 to determine if the decrease is imminent. In some embodiments, imminent refers to a time period so soon that it is impractical to attempt to cache data from the currently tuned station. For example, imminent can refer to an expected drop in less than 30 seconds, less than 1 minute, or less than 5 minutes.

If the expected decrease in signal-quality parameters is determined not to be imminent at block 169, the content of the currently tuned station can being to be cached, as illustrated by block 171, so that if and when the tune-away decision is made, the media receiver can tune to the cached content. In some embodiments, the decision to cache can be made at the time the media device is turned on, so that the presentation of the media station to the user can be delayed for a short time to build up the cached content. In other embodiments, an EPG can be consulted for an alternate source of content scheduled to be broadcast on the currently tuned station, and content from that alternate source can be cached in advance, and played out in place of the same content being provided by the media station currently tuned-to.

If it is determined at block 169 that the upcoming decrease in signal-quality parameters is imminent or likely to be imminent, leaving insufficient time to cache a meaningful amount of content, the media receiver can be preemptively tuned to the alternate station as illustrated at block 173. This preemptive tuning can be timed to coincide with a break in the playback of media content, so that a currently playing media item is not cut off abruptly. Furthermore, a media receiver can be configured to perform a fade-out and/or fade in of the alternate station so that the change between media stations is not perceived as being jarring by the media consumer.

Referring next to FIG. 10, a flowchart illustrating a method 180 of selecting alternate media stations will be discussed according to various embodiments of the present disclosure. As illustrated at block 181, user listening patterns related to situational parameters are obtained. Situational parameters can include, but are not limited to, timing and location information, user preferences, and information associated with tune-away events. For example, if a user consistently chooses to tune to a country western station after a tune-away event, regardless of the genre of the original station, that information can be taken into account when selecting an alternate station to tune-to in response to signal-quality parameters dropping below a threshold. Likewise, if a user consistently tunes to a news or talk channel during particular times of the day, or at particular geographic locations, that information can be stored as a part of the user's listening patterns and used in selecting an alternate media station.

As illustrated at block 183, the current situational parameters can be determined. Examples of current situational parameters can include, within 30 seconds after an automated tune-away event, within 2 minutes before an automated tune-away event, within 5 minutes of powering on the media receiver, and within 5 minutes of an expected arrival at a destination. Signal-quality parameters are also examples of situational parameters. So, for example, a current group of situational parameters can include, the current geographic location, the currently tuned station, the current time of day, the current month, the time elapsed since the last manual tune event performed by a user, the current station's content parameters, and the like.

As illustrated at block 185, one of multiple available media stations are chosen for consideration as the selected alternate media station. A list of available media stations can be obtained from an EPG, from the Internet, or determined based on a scan of stations by the media receiver. The factors used to determine whether a media station is available can include geographic location information and media receiver capability information. For example, if the media receiver is not subscribed for use with satellite radio, then satellite radio stations could be considered not available, even if an EPG indicated otherwise. Note that media receiver capabilities can be considered to be a subset of situational parameters.

Once the first media station is chosen for consideration, the attributes of that media station can be determined, as illustrated by block 187. A check is made at block 191 to determine wither the attributes of the media station satisfy the user listening patterns for the current situational parameters. Consider, for example, a media receiver currently tuned to a news station at 8:58 pm on a Saturday. The user consistently tunes to a classic rock station at 9 pm on Saturday nights, and method 180 is being invoked to choose an alternate media station because of a tune-away event at 8:59 pm on Saturday caused by a large number of lost packets. In this situation, the media receiver can choose to tune to a classic rock station, even though if method 180 were invoked at 8:00 am on Sunday another news station could have been selected because of the interplay of different situational parameters and user listening patterns.

If the media station being considered for assignment as the alternate media station does not satisfy the user listening pattern and the current situational parameters, method 180 can continue to consider other available media stations until an appropriate station is considered. In some embodiments, the first considered media station that satisfies the user listening patterns and the current situational parameters is selected as the alternate media station. In other embodiments, multiple media stations are considered, and the best match of the group of media stations considered is selected. In some embodiments, if after consideration of a set number of available media stations an alternate media station has not been selected, the selection criteria for the alternate media station can be relaxed, or a default alternate station can be selected. For example, a user can be provided the opportunity to select and rank one or more default media stations in order of user preference as alternate media stations. In some embodiments, the highest user-ranked preferred media station is selected for an alternate media station.

As illustrated by block 193, if the attributes of the available media station under consideration satisfy the user listening patterns for the current situational parameters, the available media item being considered is selected as the alternate media station.

In some embodiments, method 180 can also be invoked to choose an original media station upon initialization of the media receiver. In those cases, the situational parameters can include "receiver initialization," and user listening patterns can include the identity of the radio station most often tuned to by the user at startup, a default media station selected according to user preferences, or otherwise. Furthermore, in some embodiments the available media station selected at block 193 can be used as the original media station.

Other and further embodiments utilizing one or more aspects of the systems and methods described above may be devised without departing from the spirit of Applicant's invention. For example, the above OIMR methodology may be an advantage to any system that seeks to support merge replication and database interoperability. Further, the various systems, methods, and embodiments disclosed herein may be included in combination with each other to produce variations of the disclosed systems, methods, and embodiments. Discussion of singular elements can include plural elements and vice-versa.

The order of steps in methods described herein may occur in a variety of sequences unless otherwise expressly stated. The various steps described herein may be combined with other steps, interlineated with the stated steps, or split into multiple steps. Similarly, elements described functionally may be embodied as separate components or may be combined into components having multiple functions.

The apparatus, systems, and methods disclosed in this application have been described in the context of certain exemplary embodiments, and not every embodiment of the invention has been described. Various modifications and alterations to the described embodiments are discernible to persons of ordinary skill in the art. The disclosed and undisclosed embodiments are not intended to limit or restrict the scope or applicability of the invention claimed herein, but rather, in conformity with the patent laws, Applicants intend to fully protect all such modifications and improvements that come within the scope of the appended claims, including equivalents thereof.

The foregoing figures and written description of specific structures and functions are not presented to limit the scope of what Applicants have invented or the scope of the appended claims. Rather, they are provided to teach a person of ordinary skill in the art how to make and use the inventions for which patent protection is sought and the best mode of practicing the same. Those persons skilled in the art will appreciate that not all features of a commercial embodiment of the inventions are described or shown for the sake of clarity and understanding. Persons of ordinary skill in the art will also appreciate that the development of an actual commercial embodiment incorporating aspects of the present inventions may require numerous implementation-specific decisions to achieve the developer's ultimate goal for the particular commercial embodiment. Such implementation-specific decisions may include, but likely are not limited to, compliance with system-related, business-related, government-related and other constraints, which may vary by specific implementation, location and from time to time. While a particular developer's efforts might be complex and time-consuming in an absolute sense, such efforts would be, nevertheless, a routine undertaking for those of ordinary skill in the art having the benefits of this disclosure. It must be understood that the inventions disclosed and taught herein are susceptible to numerous and various modifications and alternative forms.

What is claimed is:

1. A method for use in a wireless receiver tuned to a first channel associated with a first media station, the method comprising:

receiving, on the first channel, a wireless signal associated with the first media station;

monitoring at least one signal-quality parameter of the wireless signal, wherein the at least one signal-quality parameter includes a signal to noise ratio (SNR);

maintaining a history of the at least one signal-quality parameter, the history indicating an association between a value of the at least one signal-quality parameter and a situational parameter;

receiving, via a communications network, information associated with current situational parameters;

determining a current situational parameter based on the information; and determining, based on the current situational parameter and the history, that a value of the at least one signal-quality parameter is expected to drop below a threshold level within a period of time; and preemptively tuning the wireless receiver from the first media station, automatically without human action, to an alternate media station on a second channel prior to an expiration of the period of time.

2. The method of claim 1, wherein:

determining the current situational parameter includes determining a current geographic area; and preemptively tuning is performed in response to determining that the current geographic area corresponds to a geographic area at which the at least one signal-quality parameter has been historically anticipated to drop below the threshold level.

3. The method of claim 2, wherein:

determining the current situational parameter includes determining a current time of day; and preemptively tuning is performed in response to determining that the current geographic area and the current time of day correspond to a historical geographic area and a historical time of day at which the at least one signal-quality parameter has been historically anticipated to drop below the threshold level.

4. The method of claim 1, further comprising:

associating a historical value of the at least one signal-quality parameter with a historical time of year; and determining that a value of the at least one signal-quality parameter is expected to drop below a threshold level based, at least in part on a comparison of a current time of year with the historical time of year.

5. The method of claim 1, wherein preemptively tuning is timed to coincide with a break in playback of media content.

6. The method of claim 1, wherein:

maintaining the history includes recording signal-quality parameters along with a geographic location, time, and date information.

7. The method of claim 1, wherein determining a current situational parameter includes determining a geographic location of the wireless receiver based, at least in part, on input received from a global positioning satellite unit.

8. A wireless receiver comprising:

a processor;

memory operably associated with the processor;

a wireless receiver coupled to the processor; and a non-transitory program of instructions stored in the memory and executable by the processor to implement a method including the following:

receive a wireless signal associated with the first media station;

monitor the wireless signal to determine situational parameters historically present when a signal quality of the wireless signal falls below a tune-away threshold;

maintaining a history including the of the at least one signal-quality parameter, the history indicating an association between a value of the at least one signal-quality parameter and a situational parameter;

determining a current situational parameter, wherein the current situational parameter includes at least one time-related parameter; and determining, based on the current situational parameter and the history, that a value of the at least one signal-quality parameter is expected to drop below the tune-away threshold within a period of time; and automatically tune the wireless receiver from the first media station to an alternate media station prior to an expiration of the period of time.

9. The wireless receiver of claim 8, wherein:

determining the current situational parameter includes determining a current geographic location; and automatically tuning is performed in response to determining that the current geographic location is associated with a geographic location at which the at least one signal-quality parameter has historical dropped below the tune away threshold.

10. The wireless receiver of claim 9, wherein:

determining the current situational parameter includes determining a current time of day; and preemptively tuning is performed in response to determining that the current geographic location and the current time of day correspond to a historical geographic location and a historical time of day associated with the at least one signal-quality parameter dropping below the tune away threshold.

11. The wireless receiver of claim 8, further comprising:

associating a historical value of the at least one signal-quality parameter with a historical time of year; and determining that a value of the at least one signal-quality parameter is expected to drop below a threshold level based, at least in part on a comparison of a current time of year with the historical time of year.

12. The wireless receiver of claim 8, wherein preemptively tuning is timed to coincide with a break in playback of media content.

13. The wireless receiver of claim 8, wherein:

maintaining the history includes recording signal-quality parameters associated with a geographic location, time, and date information.

14. The wireless receiver of claim 8, wherein:

the at least one signal quality parameter is selected from the group of signal quality parameters consisting of: signal-to-noise ratio (SNR), signal amplitude, variations in signal amplitude, signal frequency, variations in signal frequency, a bit-error-rate (BER), a packet error rate (PER), transmission lag, and an ability to maintain a lock on a radio frequency (RF) carrier signal used to transmit media content.

15. A mobile device comprising:

a wireless radio receiver configured to receive first media station content over an Internet Protocol (IP) broadcast channel;

memory;

a processor coupled to the memory and the wireless radio receiver, the processor programmed to;

determine instances of signal quality degradations, wherein signal quality degradations indicate that a signal-quality parameter of the first media station has fallen below a tune-away threshold;

determine times and locations of the mobile device at which the instances occurred;

associate the instances with the times and the locations of the mobile device;

store, in the memory, a history of the instances of signal quality degradations, including the times and the locations of the mobile device;

determine a current time and a current location of the mobile device;

determine that the signal quality of the first media station is expected to fall below the tune away threshold based, at least in part, on a comparison of the current time and the current location of the mobile device with the history of the instances of signal quality degradations; and preemptively tune the wireless receiver from the first media station to an alternate media station in response to determining that the signal quality of the first media station is expected to fall below the tune away threshold.

16. The mobile device of claim 15, further comprising:

associating a historical value of the signal-quality parameter with a historical time of year; and determining that a value of the signal-quality parameter is expected to drop below a threshold level based, at least in part on a comparison of a current time of year with the historical time of year.

17. The mobile device of claim 15, wherein preemptively tuning is timed to coincide with a break in playback of media content included in the first media station content.

18. The mobile device of claim 15, further comprising:

an over-the-air (OTA) radio tuner; and wherein preemptively tuning to the alternate media station includes tuning to a second media station received via the OTA radio tuner.

19. The mobile device of claim 15, wherein:

the signal quality parameter is selected from the group of signal quality parameters consisting of: signal-to-noise ratio (SNR), signal amplitude, variations in signal amplitude, signal frequency, variations in signal frequency, a bit-error-rate (BER), a packet error rate (PER), transmission lag, and an ability to maintain a lock on a radio frequency (RF) carrier signal used to transmit media content.

20. The mobile device of claim 15, further comprising:

an interface coupled to a global positioning satellite receiver.

* * * * *